US009158909B2

(12) United States Patent
Doane et al.

(10) Patent No.: US 9,158,909 B2
(45) Date of Patent: Oct. 13, 2015

(54) AUTHENTICATION OF VIRTUAL MACHINE IMAGES USING DIGITAL CERTIFICATES

(71) Applicant: Amazon Technologies, Inc., Reno, NV (US)

(72) Inventors: Andrew Jeffrey Doane, Vienna, VA (US); Alexander Edward Schoof, Herndon, VA (US); Robert Eric Fitzgerald, Herndon, VA (US); Todd Lawrence Cignetti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 14/196,818

(22) Filed: Mar. 4, 2014

(65) Prior Publication Data

US 2015/0254451 A1 Sep. 10, 2015

(51) Int. Cl.
*G06F 21/00* (2013.01)
*G06F 21/44* (2013.01)
*H04L 29/06* (2006.01)

(52) U.S. Cl.
CPC ............... *G06F 21/44* (2013.01); *H04L 63/20* (2013.01)

(58) Field of Classification Search
CPC ......... G06F 21/51; G06F 21/64; G06F 21/54; G06F 21/44; H04L 63/20
USPC ........................................................ 726/1–4
See application file for complete search history.

(56) References Cited

U.S. PATENT DOCUMENTS

| 2007/0136579 | A1* | 6/2007 | Levy et al. ............... 713/168 |
|---|---|---|---|
| 2007/0204166 | A1* | 8/2007 | Tome et al. ............... 713/182 |
| 2007/0294676 | A1 | 12/2007 | Mellor et al. |
| 2009/0094673 | A1* | 4/2009 | Seguin et al. ................ 726/1 |
| 2009/0172781 | A1* | 7/2009 | Masuoka et al. ............ 726/3 |
| 2009/0204964 | A1* | 8/2009 | Foley et al. ................. 718/1 |
| 2010/0050239 | A1* | 2/2010 | Carter et al. ................ 726/4 |
| 2011/0246778 | A1* | 10/2011 | Duane ........................ 713/176 |
| 2012/0023568 | A1* | 1/2012 | Cha et al. ................... 726/10 |
| 2012/0131591 | A1 | 5/2012 | Moorthi et al. |
| 2012/0233668 | A1* | 9/2012 | Leafe et al. ................. 726/4 |
| 2012/0260250 | A1* | 10/2012 | Maeda et al. ............... 718/1 |
| 2012/0266170 | A1* | 10/2012 | Zimmerman et al. ....... 718/1 |
| 2013/0061293 | A1* | 3/2013 | Mao ........................... 726/4 |
| 2013/0097296 | A1* | 4/2013 | Gehrmann et al. ........ 709/223 |
| 2013/0198743 | A1* | 8/2013 | Kruglick .................... 718/1 |

(Continued)

OTHER PUBLICATIONS

International Search Report and Written Opinion mailed Jul. 1, 2015, International Patent Application No. PCT/US2015/18534, filed Mar. 3, 2015.

*Primary Examiner* — Haresh N Patel
(74) *Attorney, Agent, or Firm* — Davis Wright Tremaine LLP

(57) ABSTRACT

A vendor of virtual machine images accesses a virtual computer system service to upload a digitally signed virtual machine image to a data store usable by customers of the virtual computer system service to select an image for creating a virtual machine instance. If a digital certificate is uploaded along with the virtual machine image, the virtual computer system service may determine whether the digital certificate has been trusted for use. If the digital certificate has been trusted for use, the virtual computer system service may use a public cryptographic key to decrypt a hash signature included with the image to obtain a first hash value. The service may additionally apply a hash function to the image itself to obtain a second hash value. If the two hash values match, then the virtual machine image may be deemed to be authentic.

20 Claims, 9 Drawing Sheets

(56) References Cited

U.S. PATENT DOCUMENTS

| | | | |
|---|---|---|---|
| 2013/0238785 A1* | 9/2013 | Hawk et al. | 709/224 |
| 2013/0275973 A1 | 10/2013 | Greenfield et al. | |
| 2013/0290694 A1* | 10/2013 | Civilini et al. | 713/2 |
| 2013/0291062 A1 | 10/2013 | Bursell | |
| 2014/0053245 A1 | 2/2014 | Tosa et al. | |
| 2014/0059226 A1* | 2/2014 | Messerli et al. | 709/226 |
| 2014/0282889 A1* | 9/2014 | Ishaya et al. | 726/4 |

* cited by examiner

US 9,158,909 B2

AUTHENTICATION OF VIRTUAL MACHINE IMAGES USING DIGITAL CERTIFICATES

BACKGROUND

Computing technologies evolved and continue to evolve to keep up with the demands of the organizations that use them. Many organizations, for example, utilize a virtual computer system service for, among other reasons, remotely operating one or more virtual machine instances. These virtual machine instances may be created using a virtual machine image that comprises a software configuration, which may include an operating system that defines the operating environment for the virtual machine instances. These virtual machine images may be made available through a variety of sources. Despite their many advantages, it may be difficult to determine whether the virtual machine image used for creating a virtual machine instance is authentic or is being provided by a trusted source. Thus, the organizations that utilize these virtual computer systems may bear the risk of creating one or more virtual machine instances that may comprise malicious software which, in turn, may reduce the security of their own infrastructures.

BRIEF DESCRIPTION OF THE DRAWINGS

Various embodiments in accordance with the present disclosure will be described with reference to the drawings, in which.

DETAILED DESCRIPTION

Figure 1:
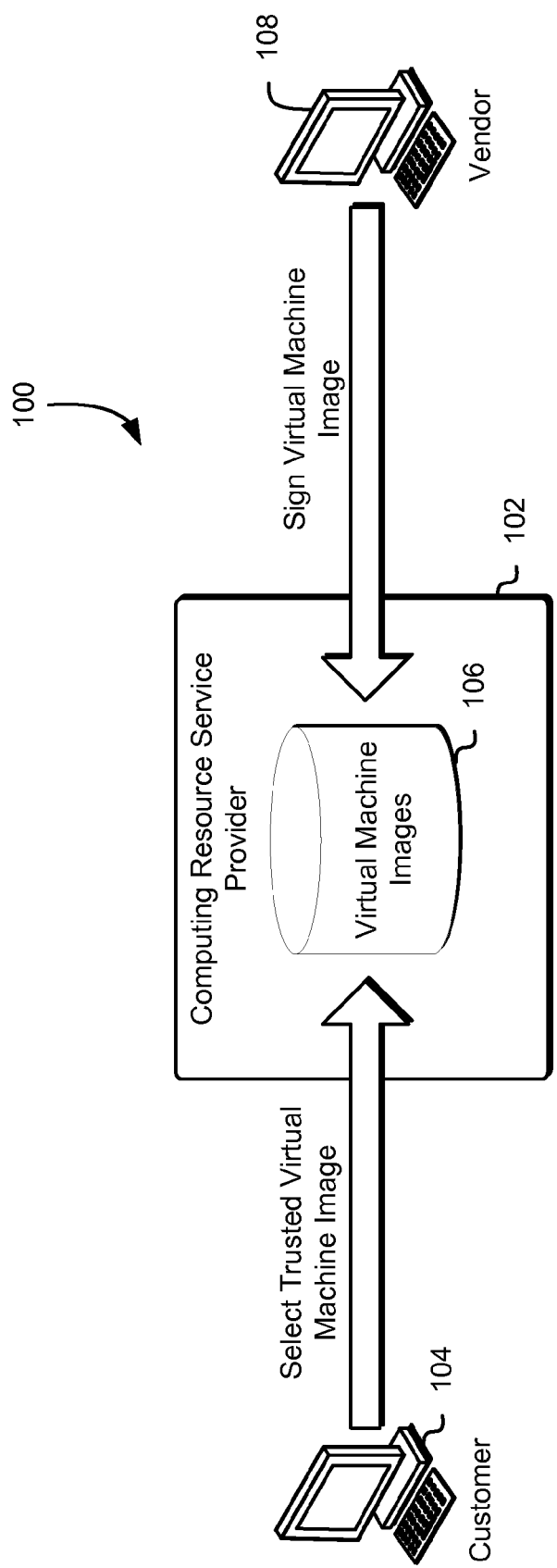
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of digital certificates to authenticate one or more virtual machine images for use in creating virtual machine instances. In an embodiment, an entity (e.g., an organization) can communicate with a virtual computer system service, such as through appropriately configured application programming interface (API) calls to the service, to request creation of a vendor account. The entity may be a vendor or other machine image provider that may utilize a computing resource service provider account to create and provide various virtual machine images that may be used by customers of the computing resource service provider to create new virtual machine instances. In addition to the request, the vendor may authenticate with the computing resource service provider, such as by providing the virtual computer system service with one or more credentials and/or information derived therefrom (e.g., a digital signature) which may be used to verify the identity of the vendor. Accordingly, if the virtual computer system service is able to verify the identity of the vendor, the virtual computer system service may grant the vendor permission to attach a digital certificate to each virtual machine image introduced by the vendor. The digital certificates in turn can be used, by the virtual computer system service, to verify each virtual machine image introduced by the vendor actually came from the vendor. Alternatively, the vendor may provide a digital certificate of his/her own which the virtual computer system service may persistently store within a trust store for verification of the vendor-provided virtual machine images. The vendor may create one or more virtual machine images, digitally sign these one or more virtual machine images and include the agreed upon digital certificate.

In some embodiments, the vendor may upload the one or more virtual machine images to the virtual computer system service. The one or more virtual machine images may be uploaded to the virtual computer system service along with a digital certificate, which the virtual computer system service may utilize to determine whether the one or more virtual machine images may be added to the marketplace. For instance, if the digital certificate included with the one or more virtual machine images was created by the vendor, the virtual computer system service may access a trust store to determine whether the digital certificate may be trusted. Alternatively, if the virtual computer system service has previously provided the digital certificate to the vendor for use in signing the virtual machine images, the virtual computer system service may allow any virtual machine images that include this digital certificate to be added to the marketplace. Once the one or more virtual machine images are added to the marketplace, the virtual computer system service may include an indicator (e.g., icon, message, etc.) next to the entry in the marketplace to indicate that these virtual machine images have been deemed to be from a trusted vendor.

In an embodiment, the virtual computer system service may provide customers with the option to individually verify the authenticity of a vendor digital certificate in order to ensure that the virtual machine images are authentic. For instance, if the customer selects a virtual machine image from a plurality of virtual machine images in a computing resource service provider marketplace, the customer may be granted access to one or more modules of executable code or applications, provided by the virtual computer system service, to verify that the virtual machine image is authentic. In an embodiment, the customer may use these one or more applications to hash the virtual machine image itself and obtain a first hash value (often referred to as a "digest"). The customer may further utilize these one or more applications to obtain the vendor's public cryptographic key from the digital certificate to decrypt a signature included in the virtual machine image and obtain a second hash value. If these two hash values match, then the customer may determine that the digital signature is valid and he/she can trust the virtual machine image for use in creating a virtual machine instance.

In an embodiment, a customer of the virtual computer system service may select a virtual machine image from the marketplace to launch a new virtual machine instance. Accordingly, the virtual computer system service may evaluate one or more customer and/or virtual machine image policies that place restrictions on launching virtual machine instances from the virtual machine image. For instance, a customer can add policy that specifies the subnet or characteristics within a subnet within a virtual network a virtual machine instance can be launched (e.g., restrictions based on whether the subnet has an Internet gateway attached to it, whether the subnet has been tagged with a certain label, whether the subnet has instances of a certain type or from a certain vendor, etc.). In the same or another configuration, the virtual machine image itself may include a set of policies set by the vendor that replace restrictions on using the image to create instances. If the virtual computer system service determines, based at least in part on an evaluation of the customer and/or virtual machine image policies that the customer may generate a virtual machine instance using the selected virtual machine image, the virtual computer system service may instantiate the virtual machine image to a physical host and enable the customer to use the newly created virtual machine instance.

In this manner, a vendor may utilize a private cryptographic key to digitally sign a virtual machine image and include a digital certificate comprising a public cryptographic key in order to provide a method for authentication of the virtual machine image for the computing resource service provider and the customers that utilize virtual machine images to create one or more virtual machine instances. In addition, the techniques described and suggested herein facilitate additional technical advantages. For example, because, in some embodiments, the virtual computer system service can verify the authenticity of a virtual machine image based at least in part on its digital signature, the virtual computer system service may be able to filter virtual machine images based at least in part on which images may be cryptographically verifiably authentic. This, in turn, may allow customers of the computing resource service provider to obtain authentic virtual machine images from the marketplace without need to further verify the authenticity of the selected virtual machine image.

FIG. 1 shows an illustrative example of an environment 100 in which various embodiments can be practiced. In the environment 100, a computing resource service provider 102 may provide various computing resource services to customers of the computing resource service provider. The computing resource service provider 102 may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider 102 may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an individual or organization that could utilize one or more services provided by the computing resource service provider 102 to remotely manage computing resources to support his or her operations, such as webpage development or database management. The customer 104 may, through a customer computing device, submit one or more requests to a virtual computer system service provided by the computing system service provider 102 to configure a virtual machine instance which may be used to support the customer's needs. For instance, in an embodiment, the customer 104 may access a marketplace, provided by the virtual computer system service, to select an appropriate virtual machine image from a virtual machine image data store 106. The selected virtual machine image may comprise an operating system and additional applications which may be used to support a virtual machine instance. This selected virtual machine image may be added to a listing of virtual machine images that may be utilized by the customer 104 to instantiate a new virtual machine instance. Thus, when a customer 104 selects an appropriate virtual machine image from the listing, the virtual computer system service may instantiate this virtual machine image to a physical host provided by the computing resource service provider 102 and enable the customer 104 to utilize the newly created virtual machine instance.

The virtual machine images stored within the virtual machine image data store 106 may originate from a plurality of sources. For instance, the computing resource service provider 102 may create one or more virtual machine images for creating virtual machine instances in order to provide a customer 104 with a single source for all of his/her computing needs. Additionally, the virtual computer system service may enable other entities, including its own customers and third-party vendors, to create and upload virtual machine images to the virtual machine image data store 106 to provide customers with greater variety in selecting a virtual machine image for creating a virtual machine instance.

Accordingly, as illustrated in FIG. 1, the environment 100 includes a vendor 108. The vendor 108 may also be an individual or organization that could utilize the virtual computer system service provided by the computing resource service provider 102 to create and/or make available one or more virtual machine images for purchase. The vendor 108 may, through a vendor computing device, submit one or more requests to a virtual computer system service provided by the computing system service provider 102 to request creation of a vendor account usable for uploading virtual machine images to the virtual machine image data store 106. Within the one or more requests, the vendor 108 may provide credential information which may be used by the virtual computer system service to verify the vendor's 108 identity. Once the vendor's 108 identity has been verified, the virtual computer system service may provide a digital certificate to the vendor 108, which the vendor 108 may attach to a digitally signed virtual machine image that may be uploaded to the virtual machine image data store 106. Alternatively, the vendor 108 may be granted access to a trusted network connection which may be used to upload the virtual machine images to the virtual machine image data store 106. Accordingly, the virtual computer system service may digitally sign each of these virtual machine images and confirm that each of these virtual machine images is authentic.

When a customer 104 selects a virtual machine image from the virtual machine image data store 106, the virtual computer system service may determine whether the customer 104 is authorized to utilize this virtual machine image to create a new virtual machine instance. For instance, the customer 104 may create one or more policies to define a level of access to resources provided by certain vendors. This may include allowing virtual machine images from a certain vendor to be used to generate virtual machine instances for the customer 104. Alternatively, the policies may include a list of vendors whose resources are not to be used. In an embodiment, a vendor 108 may also attach one or more policies to his/her virtual machine images to determine which entities may utilize these virtual machine images. For instance, if a customer 104 currently utilizes one or more resources from a competitor of the vendor 108 or that may conflict with a virtual machine image provided by the vendor 108, the vendor 108 may generate a policy to prohibit this customer 104 from utilizing his/her virtual machine images. Thus, based at least in part on the policies defined by the customer 104 and/or included within the selected virtual machine image itself, the virtual computer system service may determine whether the selected virtual machine image may be used to support a new virtual machine instance on behalf of the customer 104.

Figure 2:
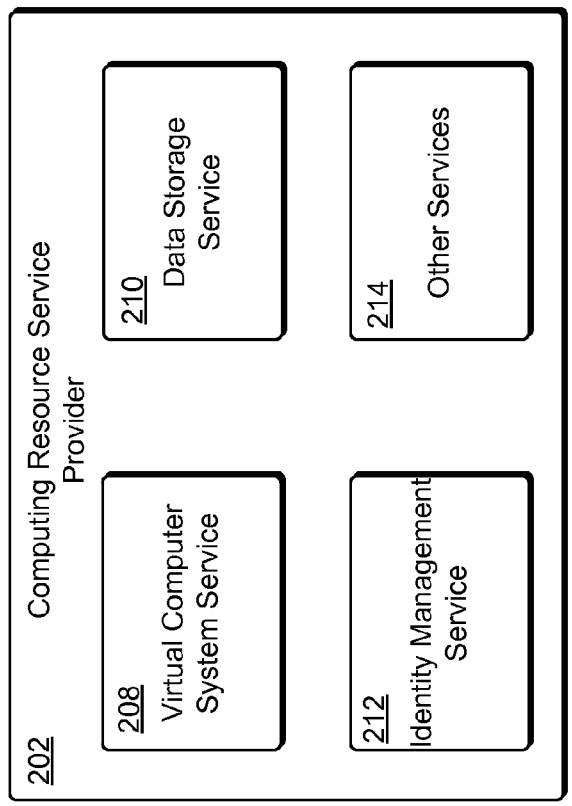
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to remotely generate, test and maintain one or more web servers or applications. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least two types of services. The services provided by the computing resource service provider, in this example, include a virtual computer system service 208, a data storage service 210, an identity management service 212 and one or more other services 214, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computer systems on behalf of the customers 204 of the computing resource service provider 202. Customers 204 of the computing resource service provider 202 may interact with the virtual computer system service 208 to provision and operate virtual computer systems that are instantiated on physical computing devices hosted (e.g., physical hosts) and operated by the computing resource service provider 202. The virtual computer systems may be used for various purposes, such as to operate as servers supporting a website. Other applications for the virtual computer systems may be to support database applications, electronic commerce applications, business applications and/or other applications.

When a customer 204 interacts with the virtual computer system service 208 to provision a virtual machine instance, the customer 204 may gain access to a variety of resources. For instance, a virtual machine instance may provision a virtual machine image, which may include an operating system and a variety of applications depending on the customer's needs. Accordingly, the virtual computer system service 208 may enable the customer 204 to select a virtual machine image from a plurality of virtual machine images. The virtual computer system service 208 may be configured to determine whether the customer 204 is permitted to utilize the selected virtual machine image to create a new virtual machine instance. As noted above, the virtual computer system service 208 may evaluate one or more customer 204 and/or virtual machine image policies to determine whether the customer 204 is allowed or prohibited from using the virtual machine image to create a virtual machine instance. For instance, as will be described in greater detail below, the virtual computer system service 208 may interact with the identity management service 212 to identify these one or more customer 204 and/or virtual machine image policies and, based at least in part on these policies, determine whether the customer 204 may use the selected virtual machine image to create the virtual machine instance.

The virtual computer system service 208 may further allow one or more vendors to upload a variety of virtual machine images to a virtual machine image data store which may be used by one or more customers to create virtual machine instances. For instance, in an embodiment, a vendor may interact with the virtual computer system service 208 to create a vendor account usable to upload virtual machine images to the virtual machine image data store. The vendor may provide credential information within the request to create the account, which the virtual computer system service 208 may utilize to verify the identity of the vendor. Subsequently, the virtual computer system service 208 may grant the vendor a digital certificate that the vendor may attach to a digitally signed virtual machine image that is to be uploaded to the virtual machine image data store.

When a vendor attempts to upload a virtual machine image to the virtual machine image data store, the virtual computer system service 208 may determine whether the virtual machine image has been digitally signed and, if so, decrypt the signature to determine whether a hash of the virtual machine image matches the decrypted signature. If there is a match, then the virtual computer system service 208 may authenticate the virtual machine image and make it available to its customers through a marketplace. Thus, a customer 204 may utilize the marketplace provided by the virtual computer system service 208 to select a trusted virtual machine image and, if desired, personally verify the authenticity of the virtual machine image by performing a verification process of the vendor's digital signature included with the selected virtual machine image. While obtaining a hash of the virtual machine image is used extensively throughout the present disclosure for the purpose of illustration, a hash may be obtained of some portion of the image sufficient to perform the authentication of the virtual machine image. For instance, the virtual computer system service 208 may be configured to hash an executable portion or some other portion of the virtual machine image deemed to be important in order to authenticate the entire virtual machine image.

The data storage service 210 may comprise a collection of computing resources that collectively operate to store data for a customer 204. The data stored in the data storage service 210 may be organized into data objects. The data objects may have arbitrary sizes except, perhaps, for certain constraints on size. Thus, the data storage service 210 may store numerous data objects of varying sizes. The data storage service 210 may operate as a key value store that associates data objects with identifiers of the data objects which may be used by the customer 204 to retrieve or perform other operations in connection with the data objects stored by the data storage service 210. Access to the data storage service 210 may be through one or more API calls appropriately configured to cause one or more actions to be performed by the data storage service 210.

The identity management service 212 may provide a variety of services to enable customers to define a level of access to other services, such as those illustrated in FIG. 2, provided by the computing resource service provider 202 and to define a level of access to resources provided by the customers and other vendors. Accordingly, a customer 204 may access the identity management service 212 to create and manage one or more users and groups that may utilize the services provided by the computing resource service provider 202. A customer 204 may utilize the identity management service 212 to generate one or more policies, which may be used to define a level of access to virtual machine images provided by certain vendors.

When a customer 204 or other user utilizes the virtual computer system service 208 to select a virtual machine image to generate a new virtual machine instance, the virtual computer system service 208 may access the identity management service 212 to determine if the customer 204 or other user is authorized to utilize the selected virtual machine image. The identity management service 212 can obtain, from a data store, all the policy attached to the requestor as well as the image, and the policy attached to the images used to launch virtual computer systems already within a customer's virtual network. The identity management service 212 can then evaluate the policies to determine whether to grant or deny the request. In an example embodiment, the policies could include a set of policy statements for allowing virtual machine images from a certain vendor to be used to generate virtual machine instances for the customer 204 or other user, so long as the images have digital signatures attached to the images from the certain vendors. Similarly, the policy statements may include a list of vendors whose resources are not to be used, or other restrictions based on characteristics of the virtual network. A vendor of virtual machine images can also generate one or more policies that are associated with his/her virtual machine images to determine which entities may utilize these virtual machine images to generate virtual machine instances. For instance, if a customer 204 utilizes one or more resources from a competitor of the vendor or that may conflict with a virtual machine image provided by the vendor, the vendor may generate a policy to prohibit this customer 204 from utilizing these virtual machine images.

The computing resource service provider 202 may additionally maintain one or more other services 214 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls to the service. This, in turn, may allow a customer 204 to maintain and potentially scale the operations in the database. Other services include, but are not limited to, object-level data storage services, object-level archival data storage services, services that manage other services and/or other services.

Figure 3:
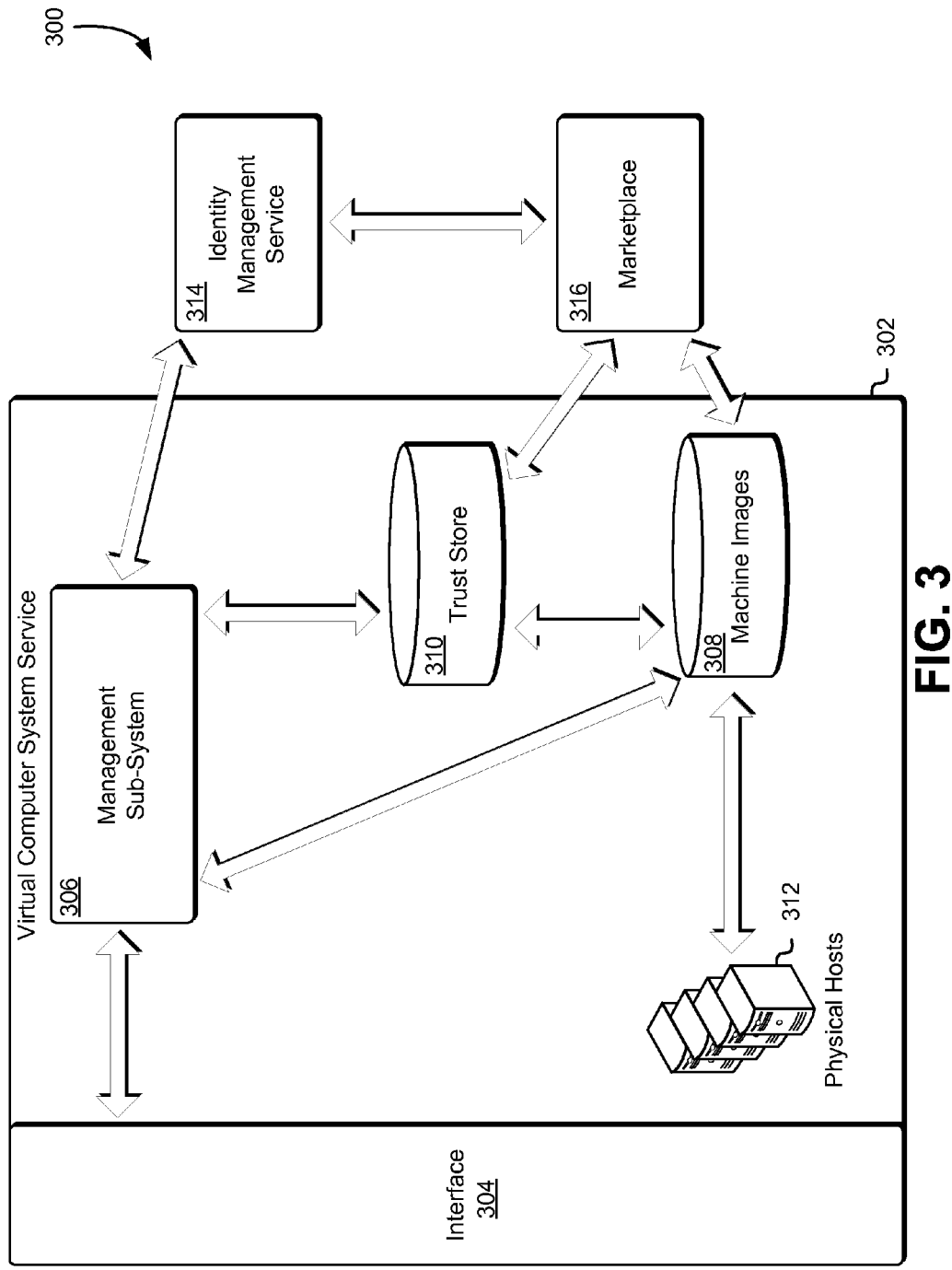
FIG. 3 shows an illustrative example of an environment that includes one or more components of a virtual computer system service accordingly to at least one embodiment.

As noted above, a virtual computer system service may be used by one or more customers to provision a virtual machine instance for a variety of uses. The virtual computer system service may permit a customer to access a marketplace in order to select a virtual machine image comprising an operating system and a variety of applications that may enable a customer to perform certain functions (e.g., maintain one or more databases, store client information, develop web applications, etc.). This virtual machine image may be used to create a virtual machine instance. Accordingly, FIG. 3 shows an illustrative example of an environment 300 that includes various components of a virtual computer system service 302 in accordance with at least one embodiment. The virtual computer system service 302 may provide customers with an interface 304 that may enable a customer to access the virtual computer system service 302. A customer may utilize the interface 304 through one or more communications networks, such as the Internet. The interface 304 may contain certain security safeguards to ensure that the customer has authorization to access the virtual computer system service 302. For instance, in order to access the virtual computer system service 302, a customer may need to provide a username and a corresponding password or encryption key when using the interface 304. Additionally, requests (e.g., API calls) submitted to the interface 304 may require an electronic signature generated using a cryptographic key such that the electronic signature is verifiable by the virtual computer system service 302, such as by an authorization system (not shown).

Once the customer has gained access to the virtual computer system service 302 through the interface 304, the virtual computer system service 302 may allow the customer to interact, through the interface 304, with a management sub-system 306. For instance, the management sub-system 306 may enable a customer to remotely provision a virtual machine instance. A customer may use the interface 304 and the management sub-system 306 to generate a virtual machine instance that includes an operating system and a variety of applications suited to the customer's needs. The operating system and the various applications may be maintained in data storage in the form of machine images in a virtual machine image data store 308. The virtual computer system service 302 may maintain a variety of machine images in the virtual machine image data store 308 based on specific customer preferences, as specified in the management sub-system 306. When a customer submits a request for provisioning a virtual machine instance through the management sub-system 306, the virtual computer system service 302 may identify the machine image the customer has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host 312 for the instance.

The machine images stored within the machine image data store 308 may be provided by one or more vendors of virtual machine images through a marketplace 316 provided by the computing resource service provider. In an embodiment, a vendor accesses the marketplace 316 to generate a new vendor account which may be used to generate and upload virtual machine images. In order to generate this new vendor account, the vendor may be required to provide, to the marketplace 316, a set of credentials usable by the marketplace 316 to verify the identity of the vendor. Accordingly, the marketplace 316 may access an identity management service 314 to utilize the set of credentials to verify the identity of the vendor. If the marketplace 316, through the identity management service 314, is able to verify the identity of the vendor, the marketplace 316 may access a trust store 310 to obtain a digital certificate that may be assigned to the vendor. A trust store 310 may be a data store comprising one or more physical storage devices for storage of a plurality of digital certificates. This digital certificate may be attached to any digitally signed virtual machine images created by the vendor such that the digital certificate and the digitally signed virtual machine images may be uploaded to the virtual machine image data store 308. Alternatively, the vendor, if verified, may provide his/her own digital certificate or other cryptographic key to the trust store 310, which the management sub-system 306 or marketplace 316 may access and utilize to verify the authenticity of an uploaded virtual machine image.

In an embodiment, the vendor can further upload one or more customer and/or virtual machine image policies for each uploaded virtual machine image to the identity management service 314 to define a level of access to each of the uploaded virtual machine images for the one or more customers of the computing resource service provider. Accordingly, when a customer selects a virtual machine image from the marketplace 316 to be used to instantiate a new virtual machine instance, the virtual computer system service 208 may communicate with the identity management service 314 and determine if there are any applicable policies for this customer, for the selected virtual machine image, for the virtual network the customer is attempting to launch an instance in, etc. Based at least in part on these policies, the identity management service 314 may either allow or deny a customer request to utilize the selected virtual machine image in the way requested. Additionally, or alternatively, when a customer uses the interface 304 and the management sub-system 306 to generate a virtual machine instance utilizing a particular virtual machine image, the management sub-system 306 may access the identity management service 314 to identify and evaluate one or more customer and/or virtual machine image policies to determine whether the customer is permitted to utilize the selected virtual machine image to generate the virtual machine instance.

As noted above, if the vendor of the selected virtual machine image has created a policy that places restrictions on its use, such as a restriction that prevents use of the image to launch an instance in to a subnet that has an Internet Gateway, the management sub-system 306 may prevent the customer from using the selected virtual machine image. Alternatively, if a customer has generated a customer policy that would prohibit use of virtual machine images provided by a particular vendor, the management sub-system 306 may prevent a user of the customer account to utilize these virtual machine images. If the management sub-system 306 determines that the customer may utilize the selected virtual machine image to create a virtual machine instance, the virtual computer system service 302 may allocate the resources necessary (e.g., the processors and RAM required to operate the components of the machine image) to process the machine image. The machine image may be instantiated on one or more physical storage devices (e.g., one or more servers or hard drives) that may act as a physical host 312 for the instance.

When a customer uses the interface 304 and the management sub-system 306 to generate a virtual machine instance, the customer may select a virtual machine image from the marketplace 316. Accordingly, the management sub-system 306 may evaluate the customer, the virtual network, and/or virtual machine image policies, as noted above, to verify that the customer is authorized to utilize the selected virtual machine image. If the customer and/or a particular user associated with the customer is authorized to utilize the selected virtual machine image, the management sub-system may obtain the selected virtual machine image from the machine images data store 308. The customer may utilize one or more applications provided by the management sub-system 306 to independently verify that the selected virtual machine image is authentic. For instance, if the virtual machine image is provided to the customer along with a corresponding digital signature, the customer may utilize these one or more applications to apply a hash function to the virtual machine image to obtain a hash value or digest. Subsequently, the customer may utilize a cryptographic key to decrypt the digital signature and compare the signature hash value to the obtained hash value. If these hash values match, the customer may be able to verify that the virtual machine image is authentic. In an embodiment, each virtual machine image can include one or more components wherein at least one of these components is digitally signed. For instance, each virtual machine image may include a manifest that includes metadata associated with certain specifications of the virtual machine image. This manifest may be digitally signed instead of the entire virtual machine image, particularly if the virtual machine image is of sufficient size. Thus, the customer may be able to verify the authenticity of the virtual machine image based at least in part on the digitally signed manifest of the selected virtual machine image.

Figure 4:
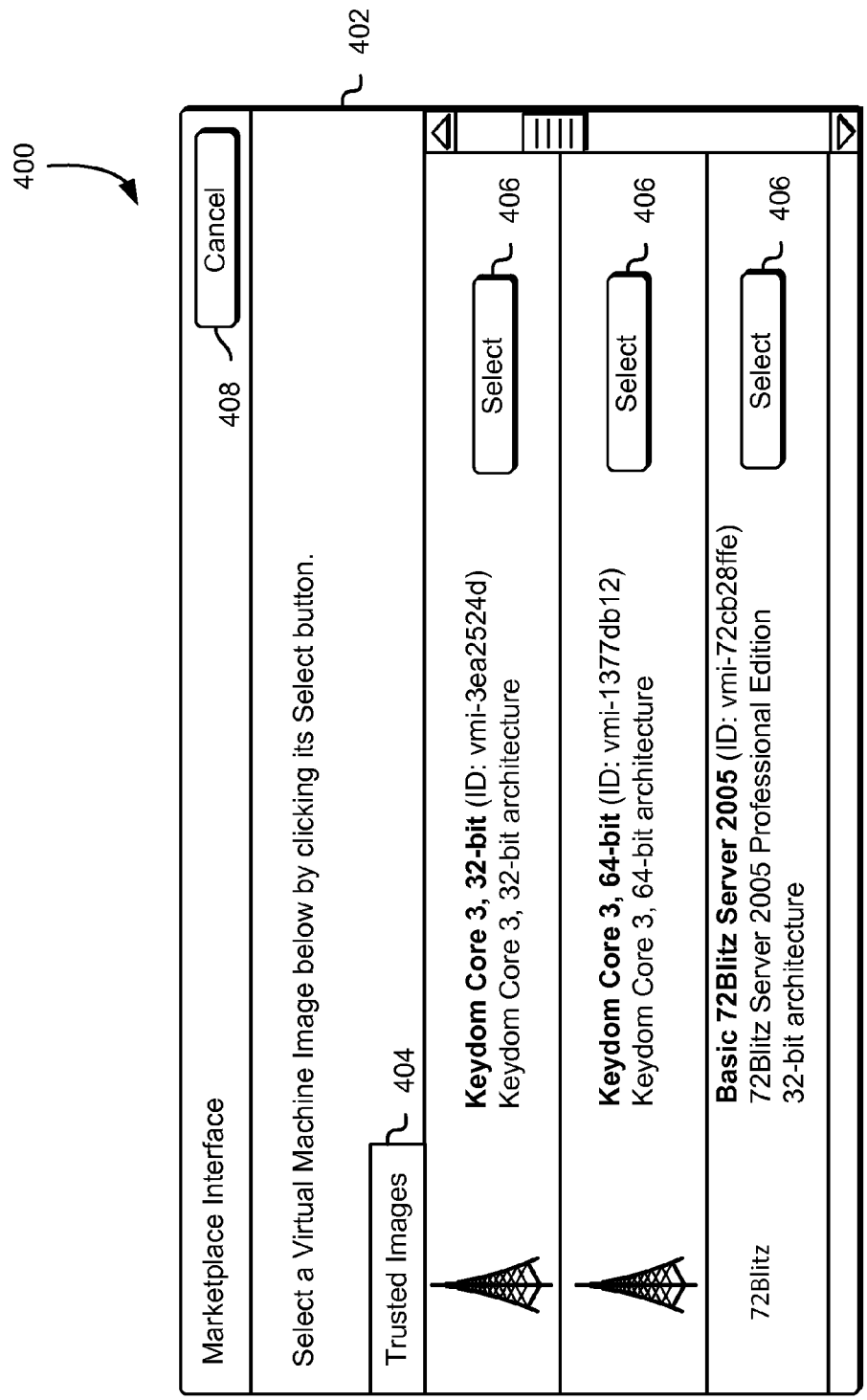
FIG. 4 shows an illustrative example of an environment that includes an interface for selecting one or more trusted virtual machine images for creation of a virtual machine instance in accordance with at least one embodiment.

As noted above, a customer may utilize a marketplace to acquire one or more virtual machine images, which may be used, through a virtual computer system service, to request creation of a new virtual machine instance. Through an interface, a customer may be able to access a marketplace that includes a listing of one or more virtual machine images that may be acquired and used to create the virtual machine instance. Accordingly, FIG. 4 shows an illustrative example of an environment 400 that includes an interface 402 for selecting one or more trusted virtual machine images that may be used, within a virtual computer system service, to create a virtual machine instance in accordance with at least one embodiment. As noted above, when a vendor requests creation of a vendor account for uploading one or more virtual machine images to a marketplace or other data store for use by customers of the virtual computer system service, the virtual computer system service may issue the vendor a digital certificate, which the vendor attach to these digitally signed virtual machine images. Accordingly, when a vendor utilizes the vendor account to upload a virtual machine image, the virtual computer system service may utilize the virtual machine image, as well as the digital signature and the digital certificate, to determine whether the image is valid. If the digital signature matches the hash of the virtual machine image, a portion of the virtual machine image, or other data signed with the private key of the vendor, then the virtual machine image may be trusted.

The virtual computer system service may configure the interface 402 to display only these trusted virtual machine images to its customers. For instance, as illustrated in FIG. 4, the interface 402 may include a trusted images tab 404 that, when selected by a customer of the virtual computer system service, may cause the interface 402 to display the trusted virtual machine images available in the marketplace. In this illustrative example, there are at least three trusted virtual machine images. These virtual machine images may be provided by different vendors, each of which may have been verified by the virtual computer system service using cryptographic material with the vendors. For instance, a vendor may provide a set of credential information (e.g., user name and password, cryptographic keys, etc.) to the virtual computer system service when the vendor requests creation of a vendor account. Accordingly, the virtual computer system service may utilize this credential information to verify the identity of the vendor and determine whether an account may be created. The credential information can then be used to create a digital certificate and sign the image.

Further, each virtual machine image, as noted above, may be uploaded to the virtual computer system service along with a digital certificate and a digital signature which may be created by encrypting a hash of the virtual machine image with a private cryptographic key of a cryptographic key pair. Upon receiving the virtual machine image, the virtual computer system service may utilize a public key included within the digital certificate to decrypt the digital signature and obtain a hash value. Subsequently, the virtual computer system service may compute a hash value for the virtual machine image and compare this value to the hash value obtained by decrypting the digital signature to determine if there is a match. If the values match, then the virtual machine image may be deemed to be authentic. Accordingly, the virtual machine image is added to a list of trusted virtual machine images which are then displayed under the trusted images tab 404 in the interface 402. Thus, a customer using the interface 402 may know that the virtual machine images listed under the trusted images tab 404 have been verified by the virtual computer system service. Additionally, the virtual computer system service may cause the interface 402 to further display an indication with each of these trusted virtual machine images, which the customer may use to verify that a virtual machine image is authentic.

Once the customer has determined which virtual machine image he/she wants to utilize to create the new virtual machine instance, the customer may, through the interface 402, utilize a select button 406 next to the listed virtual machine image under the trusted images tab 404 to select the virtual machine image. The virtual computer system service, upon detecting that the customer has utilized the select button 406 for a particular virtual machine image, may obtain the virtual machine image from a virtual machine image data store and make the virtual machine image available such that the customer may access the virtual computer system service, select the virtual machine image from a list of acquired virtual machine images and instantiate the virtual machine image onto a physical host to enable the customer to utilize the newly created virtual machine instance. Alternatively, the virtual computer system service may provide the customer with a method to independently verify that the virtual machine image selected is authentic before acquisition of the virtual machine image. For instance, when a customer selects a virtual machine image from the trusted images tab 404, the virtual computer system service may cause the interface 402 to display a new screen which may include one or more applications that may be used to determine whether the digital signature included with the selected virtual machine image is valid. Accordingly, the customer may utilize these one or more applications to determine whether the digital signature and, hence, the virtual machine image are authentic.

The virtual computer system service may further configure the interface 402 to include one or more other buttons for use by the customer. For instance, as illustrated in FIG. 4, the interface 402 may include a cancel button 408, which a customer may utilize to exit the interface 402 and thereby cancel his/her request to acquire the image. It should be noted that the interface 402 illustrated in FIG. 4 is presented for the purpose of illustration and, accordingly, may include one or more additional elements or may exclude one or more elements illustrated in FIG. 4. For instance, in addition to the trusted images tab 404, the interface 402 may include one or more additional tabs that include a listing of virtual machine images that have not been authenticated by the virtual computer system service or otherwise do not include a digital signature. Thus, a customer may be able to select a virtual machine image that has not been authenticated at his/her own risk.

Figure 5:
FIG. 5 shows an illustrative example of an environment that includes an interface for uploading a virtual machine image to a marketplace in accordance with at least one embodiment.

As noted above, the virtual computer system service may additionally provide an interface to one or more vendors to enable these vendors to upload virtual machine images to a virtual machine image data store. Accordingly, FIG. 5 shows an illustrative example of an environment 500 that includes an interface 502 for uploading a virtual machine image to a virtual machine image data store in accordance with at least one embodiment. As noted above, when a vendor submits a request to the virtual computer system service to create a vendor account for uploading virtual machine images to the virtual machine image data store, the vendor may provide additional credential information which may be used by the virtual computer system service to verify the identity of the vendor. If the identity of the vendor is verified by the virtual computer system service, the virtual computer system service may provide the vendor with a digital certificate, which may be uploaded along with a digitally signed virtual machine image to the virtual machine image data store. Alternatively, the vendor may provide the virtual computer system service with a digital certificate, which the virtual computer system service may store within a trust store. Thus, when a vendor includes his/her digital certificate with a digitally signed virtual machine image, the virtual computer system service may utilize the digital certificate stored within the trust store to verify the authenticity of the virtual machine image.

The virtual computer system service may configure the interface 502 to include one or more elements usable by a vendor to upload a virtual machine image. For instance, the interface 502 may include a company name input box 504, which a vendor may be required to utilize to provide the virtual computer system service with a name for the vendor. For instance, as illustrated in FIG. 5, the vendor has utilized the company name input box 504 to state that his/her company name is "Boom Virtual Machine Images, Inc." The interface 502 may further include a product name input box 506, which a vendor may utilize to provide a name for the virtual machine image that is to be uploaded to the virtual machine image data store. For instance, as illustrated in FIG. 5, the vendor has utilized the product name input box 506 to provide a name to his/her virtual machine image, in this case "Legion Virtual Machine Image." The virtual computer system service may require both the company name and product name for the virtual machine image in order to enable customers of the virtual computer system to determine the identity of the vendor who has provided the virtual machine image, as well as to differentiate the virtual machine image from any others stored within the virtual machine image data store.

In addition to the one or more elements usable by the vendor to provide virtual machine image information, the virtual computer system service may configure the interface 502 to include a digital certificate menu 508, which the vendor may utilize to select a digital certificate that may be included with the digitally signed virtual machine image that is to be uploaded to the virtual machine image data store. As noted above, when a vendor initially creates a vendor account, the virtual computer system service may confirm the identity of the vendor and provide this vendor with a digital certificate that may be attached to any digitally signed virtual machine images that are to be uploaded to the virtual machine image data store. Alternatively, the virtual computer system service may provide a vendor with a digital certificate for each virtual machine image that is to be uploaded to the virtual machine image data store. Accordingly, the vendor may utilize the digital certificate menu 508 to select an appropriate digital certificate (e.g., "Sherman_VMI_Inc" as illustrated in FIG. 5) which may be included with the virtual machine image. Once the virtual machine image has been digitally signed, the virtual computer system service may utilize the digital certificate to obtain a public key usable to decrypt the digital signature and obtain a hash value. Subsequently, the virtual computer system service may utilize a hash function to hash the virtual machine image and obtain a second hash value. If these hash values match, then the virtual machine image may be deemed to be authentic. In some embodiments, the virtual computer system service can utilize the public key within the digital certificate to decrypt the virtual machine image. If the virtual machine image is successfully decrypted, then the virtual machine image may be deemed to be authentic.

Once the vendor has provided a company and virtual machine image name and has selected an appropriate digital certificate, the vendor may utilize a continue button 510 to digitally sign the virtual machine image and upload the virtual machine image, along with the selected digital certificate, to the virtual machine image data store. Accordingly, the virtual computer system service may perform the digital signature verification process described above to verify the authenticity of the uploaded virtual machine image. The virtual computer system service may further include one or more additional elements in the interface 502 which the vendor may utilize for a variety of purposes. For instance, as illustrated in FIG. 5, the interface 502 may include a cancel button 512 which a vendor may utilize to exit the interface 502 and terminate the process to upload a virtual machine image. It should be noted that the interface 502 illustrated in FIG. 5 is presented for the purpose of illustration and, accordingly, may include one or more additional elements or may exclude one or more elements illustrated in FIG. 5. For instance, in addition to the digital certificate menu 508, the interface 502 may include one or more additional buttons that may enable the vendor to upload a virtual machine image without a digital certificate. Accordingly, these virtual machine images may not be verified.

Figure 6:
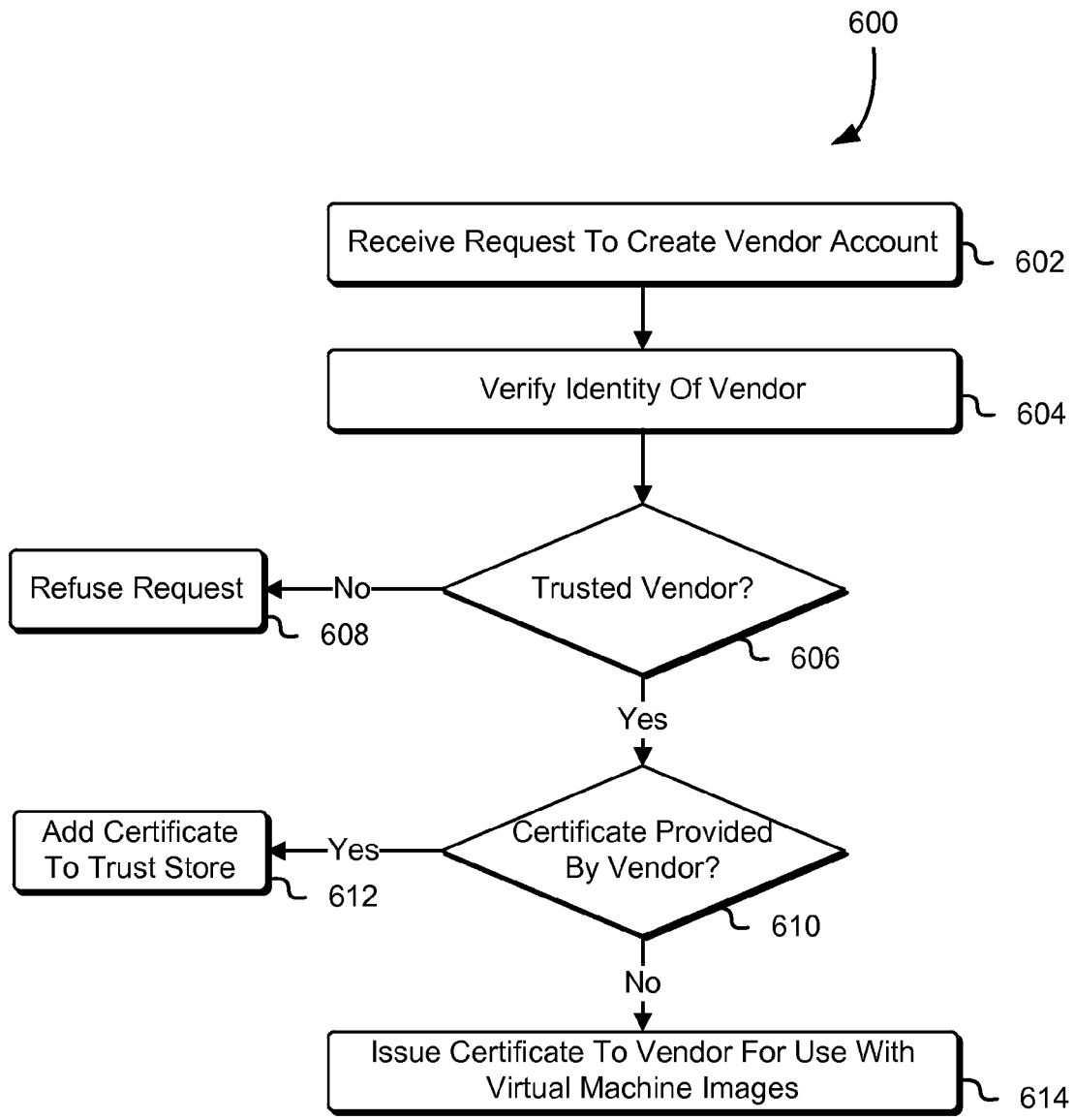
FIG. 6 shows an illustrative example of a process for creating a vendor account and issuing a digital certificate to a vendor for use in making virtual machine images available in accordance with at least one embodiment.

As noted above, a vendor may communicate with a virtual computer system service in order to create a vendor account, which the vendor may use to upload one or more virtual machine images to a virtual machine image data store managed by the virtual computer system service. Accordingly, FIG. 6 shows an illustrative example of a process 600 for creating a vendor account and issuing a digital certificate to a vendor for use in making virtual machine images available in accordance with at least one embodiment. The process 600 may be performed by a virtual computer system service configured to verify the identity of any entity making a request through the service and to issue digital certificates which a vendor may attach to any digitally signed virtual machine images that are to be uploaded. As noted above, a vendor may utilize an interface provided by the virtual computer system service to request creation of a vendor account. This vendor account may be used to upload virtual machine images to a virtual machine image data store in order to allow customers to utilize these virtual machine images. Accordingly, customers may provide payment to the vendor for use of his/her virtual machine images. Thus, creation of a vendor account may be profitable for a vendor, as the vendor may be able to monetize his/her virtual machine images if they are uploaded to the virtual machine image data store. Accordingly, the virtual computer system service may receive 602 a request from a vendor to create a vendor account.

The request provided by the vendor may include credential information which may be used by the virtual computer system service to verify 604 the identity of the vendor. For instance, if the vendor is a customer of the computing resource service provider, the vendor may provide a username and password which may be used to access the one or more services provided by the computing resource service provider. Accordingly, the virtual computer system service may utilize the username and password to locate a customer profile and obtain information regarding the vendor. For instance, this may include the name of the vendor, the physical address for the vendor and other vendor information. With this information, the virtual computer system service may be able to determine 606 whether the vendor that has submitted the request is a trusted vendor. A trusted vendor may be a customer of the computing resource service provider that has maintained an account for at least a particular period of time. Alternatively, a trusted vendor may be a customer of the computing resource service provider that has established a relationship with the computing resource service provider, such as through negotiation or other communication, which would cause the computing resource service provider to trust this customer. While a virtual computer system service is used extensively throughout the present disclosure to verify the identity of a vendor, other services, service providers and entities may be configured to verify the identity of a vendor instead of the virtual computer system service. For instance, the computing resource service provider may maintain and operate an identity management service that is configured to provide and maintain a set of credentials for each user of the one or more services provided by the computing resource service provider, including vendors of virtual machine images. Accordingly, this identity management service may be configured to receive a set of credentials from the vendor to determine the identity of the vendor and determine whether the vendor is to be considered a trusted vendor.

If the vendor is not a trusted vendor, as determined by the virtual computer system service, the virtual computer system service may refuse 608 the vendor's request to create a vendor account and may thus prevent the vendor from uploading any virtual machine images. Alternatively, a vendor may be able to upload virtual machine images without a vendor account. However, these virtual machine images may not be verified by the virtual computer system service and thus the virtual computer system service may designate these virtual machine images as not being verified.

If the virtual computer system service is able to verify that the vendor is to be considered a trusted vendor, the virtual computer system service may determine 610 whether the vendor has provided, within the request, a digital certificate that may be used to by the virtual computer system service to decrypt a digital signature included with any virtual machine images that are uploaded to the virtual machine image data store. Accordingly, the virtual computer system service may utilize a public key within the digital certificate to decrypt the digital signature within the digitally signed virtual machine image. The virtual computer system service may also apply a hash function to the virtual machine image to obtain a hash value. If the hash value matches the decrypted digital signature, then the virtual machine image may be deemed to originate from a trusted vendor and, thus, may be authentic. If the request includes a digital certificate, the virtual computer system service may add 612 the digital certificate from the vendor to a data store, where it may be kept until the vendor uploads a digitally signed virtual machine image.

If the request from the vendor does not comprise a digital certificate usable to decrypt a digital signature included with a virtual machine image, the virtual computer system service may issue 612 a digital certificate to the vendor for use with his/her virtual machine images. This digital certificate may also be stored within a data store for use in decrypting a digital signature within the digitally signed virtual machine image when uploaded by a vendor. Alternatively, since the digital certificate may be provided by the virtual computer system service, any virtual machine image that includes this digital certificate may be deemed to be authentic. It should be noted that the process 600 may include additional or fewer actions than those presented in FIG. 6. For instance, in an embodiment, the virtual computer system service will only allow trusted vendors to utilize digital certificates issued by the virtual computer system when uploading new virtual machine images to the machine images data store. Accordingly, once the virtual computer system service has determined that the vendor is a trusted vendor, the virtual computer system service may issue 614 a digital certificate to the vendor for use with his/her virtual machine images, regardless of whether the vendor has provided his/her own digital certificate or not.

Figure 7:
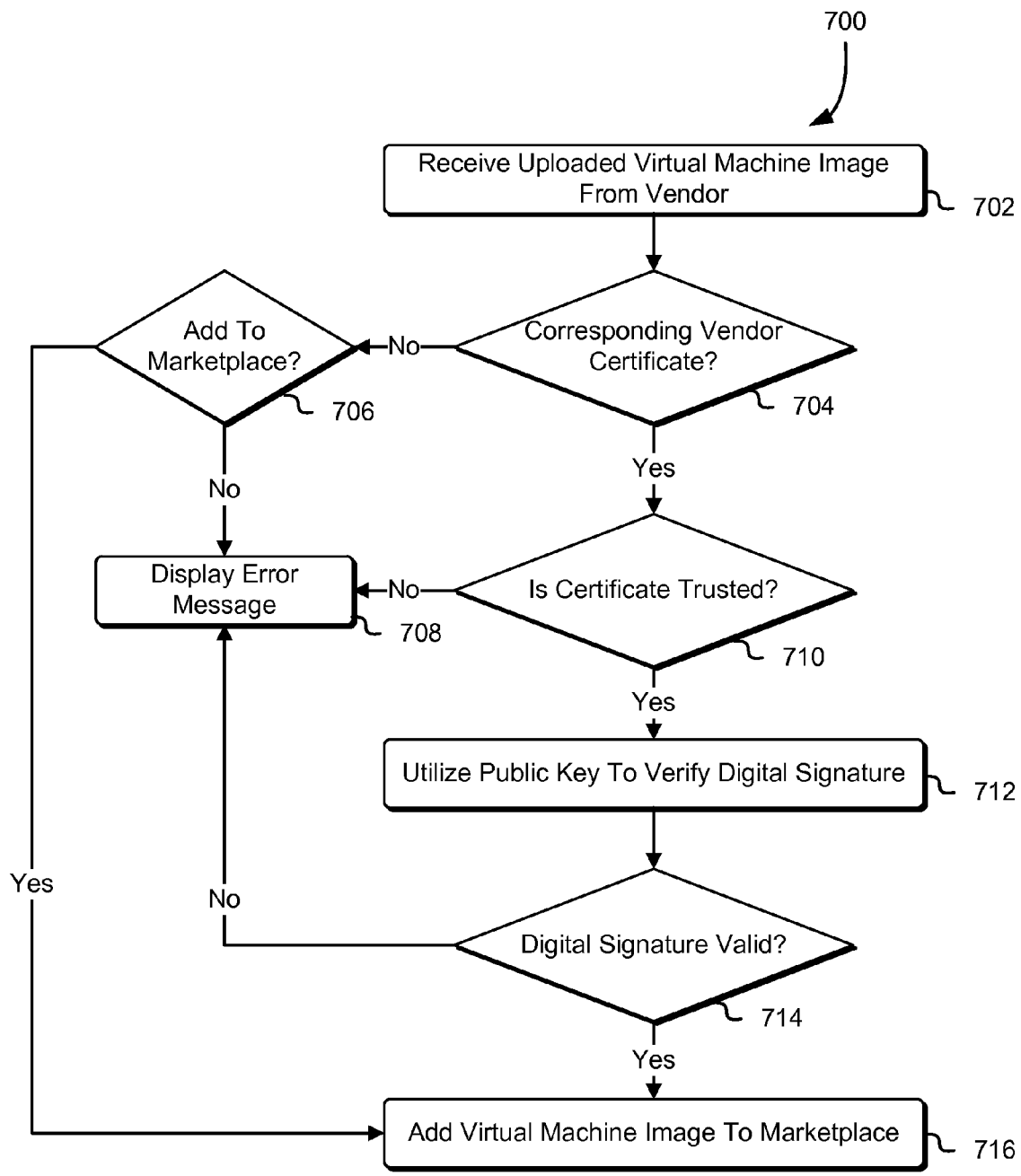
FIG. 7 shows an illustrative example of a process for adding a virtual machine image to a marketplace managed by a virtual computer system service in accordance with at least one embodiment.

As noted above, a vendor may utilize an interface provided by a virtual computer system service to upload one or more virtual machine images to a virtual machine image data store. The virtual machine images within this data store may be included in a marketplace, wherein customers of the virtual computer system service may select a virtual machine image to create a new virtual machine instance. Accordingly, FIG. 7 shows an illustrative example of a process 700 for adding a virtual machine image to a marketplace managed by a virtual computer system service in accordance with at least one embodiment. The process 700 may be performed by a virtual computer system service configured to verify one or more digital signatures included within uploaded virtual machine images. Further, the virtual computer system service may be configured to manage a marketplace that may include both trusted and unverified virtual machine images.

As noted above, a vendor may utilize an interface provided by the virtual computer system service, such as the interface illustrated in FIG. 5, to upload a virtual machine image to a virtual machine image data store. The virtual machine image data store may comprise a plurality of virtual machine images that may be used by customers of the virtual computer system service to generate a new virtual machine instance. Accordingly, the virtual computer system service may receive 702 the uploaded virtual machine image from the vendor. As will be described in greater detail below, the virtual computer system service may perform one or more actions to determine whether the virtual machine image may be added to the virtual machine image data store and/or a marketplace, thereby granting customers access to the uploaded virtual machine image.

Once the virtual computer system service has received the uploaded virtual machine image from a vendor, the virtual computer system service may determine 704 whether the uploaded virtual machine image was uploaded along with a corresponding vendor digital certificate. As noted above, when a vendor submits a request to the virtual computer system service to create a vendor account, the virtual computer system service may determine whether the vendor may be considered a trusted vendor. If the vendor is determined to be a trusted vendor, the virtual computer system service may either issue a digital certificate to the vendor for use with virtual machine images or receive a digital certificate from the vendor, which is then added to a trust store. Accordingly, the vendor may attach a digital certificate to a digitally signed virtual machine image prior to uploading the virtual machine image.

If the uploaded virtual machine image was not uploaded with a corresponding digital certificate (e.g., the virtual machine image has not been digitally signed), the virtual computer system service may determine 706 whether the uploaded virtual machine image may be added to a virtual machine image data store and/or a marketplace in order to grant customers access to the virtual machine image. For instance, if the virtual machine image does not comprise a digital certificate, then it may be difficult or impossible to verify the authenticity of the uploaded virtual machine image. Thus, the virtual computer system service may be configured to refuse to add any virtual machine images that have not been digitally signed to the virtual machine image data store and/or the marketplace, since there may be no way to know if these images comprise malicious software. If the virtual computer system service is configured to reject a virtual machine image that has not been digitally signed, then the virtual computer system service may display 708 an error message through the interface. This error message may comprise information detailing the one or more reasons for the rejection of the uploaded virtual machine image, which the vendor may utilize to either attempt to obtain a vendor account and/or attach a valid digital certificate to the virtual machine image or to terminate communication with the virtual computer system service.

If the uploaded virtual machine image was uploaded with a corresponding digital certificate, the virtual computer system service may determine 710 whether the digital certificate may be trusted. For instance, if during the vendor account creation process the virtual computer system service has provided a digital certificate to the vendor for use with virtual machine images, the virtual computer system service may examine the uploaded virtual machine image to determine whether it has been digitally signed and includes a digital certificate. Alternatively, if during the vendor account creation process the vendor provided the virtual computer system service with a digital certificate, and the digital certificate is stored within a trust store managed by the virtual computer system service, the virtual computer system service may determine whether the digital certificate included with the uploaded virtual machine image has been previously stored within the trust store. If the digital certificate included with the uploaded virtual machine image has not previously been stored within the trust store, then the digital certificate may not be trusted. If the digital certificate cannot be trusted because it is not included within a trust store managed by the virtual computer system service, the virtual computer system service may cause the interface to display 708 an error message that may comprise information detailing the one or more reasons for failure to add the virtual machine image to the virtual machine image data store and/or the marketplace.

Once the digital certificate included with the uploaded virtual machine image has been deemed, by the virtual computer system service, to be trusted, the virtual computer system service may utilize 712 the public cryptographic key included with the digital certificate to verify the digital signature of the virtual machine image. For instance, when a digitally signed virtual machine image is uploaded to the virtual machine image data store, along with a digital certificate, the virtual computer system service may extract a public cryptographic key from the digital certificate in order to decrypt the digital signature and obtain a hash value. Accordingly, this hash value may be compared to a digest of the virtual machine image to determine 714 if the digital signature is valid. If the values match, then the virtual machine image may be verified as having originated from a trusted vendor of virtual machine images. Alternatively, the digitally signed virtual machine image and corresponding digital certificate may be stored within the virtual machine image data store wherein any entity may select the virtual machine image and utilize one or more modules of executable code to independently verify that the virtual machine image originated from a trusted vendor of virtual machine images.

Once the digital signature of the virtual machine image has been verified by the virtual computer system, the virtual computer system service may add 716 the uploaded virtual machine image to the virtual machine image data store and/or the marketplace. Additionally, the uploaded virtual machine image may be added to the virtual machine image data store and/or the marketplace if it has not been digitally signed and/or does not include the digital certificate. For instance, the virtual computer system service may be configured to store any virtual machine images have not been digitally signed or cannot be authenticated (e.g., include a defective digital certificate or no digital certificate at all) in the virtual machine image data store and/or the marketplace. However, these virtual machine images may be classified as not being authenticated by the virtual computer system service. For instance, the virtual computer system service may be configured to label each of these virtual machine images as being "unverified" by the virtual computer system service. Thus, the virtual machine images stored within the virtual machine image data store and/or the marketplace may be categorized based at least in part on whether a virtual machine image is verifiable as originating from a vendor of virtual machine images. In an embodiment, if a vendor of virtual machine images uploads the virtual machine image to the virtual machine image data store through a trusted communications network channel, then the virtual computer system service may digitally sign the virtual machine image, thereby authenticating the virtual machine image itself.

Figure 8:
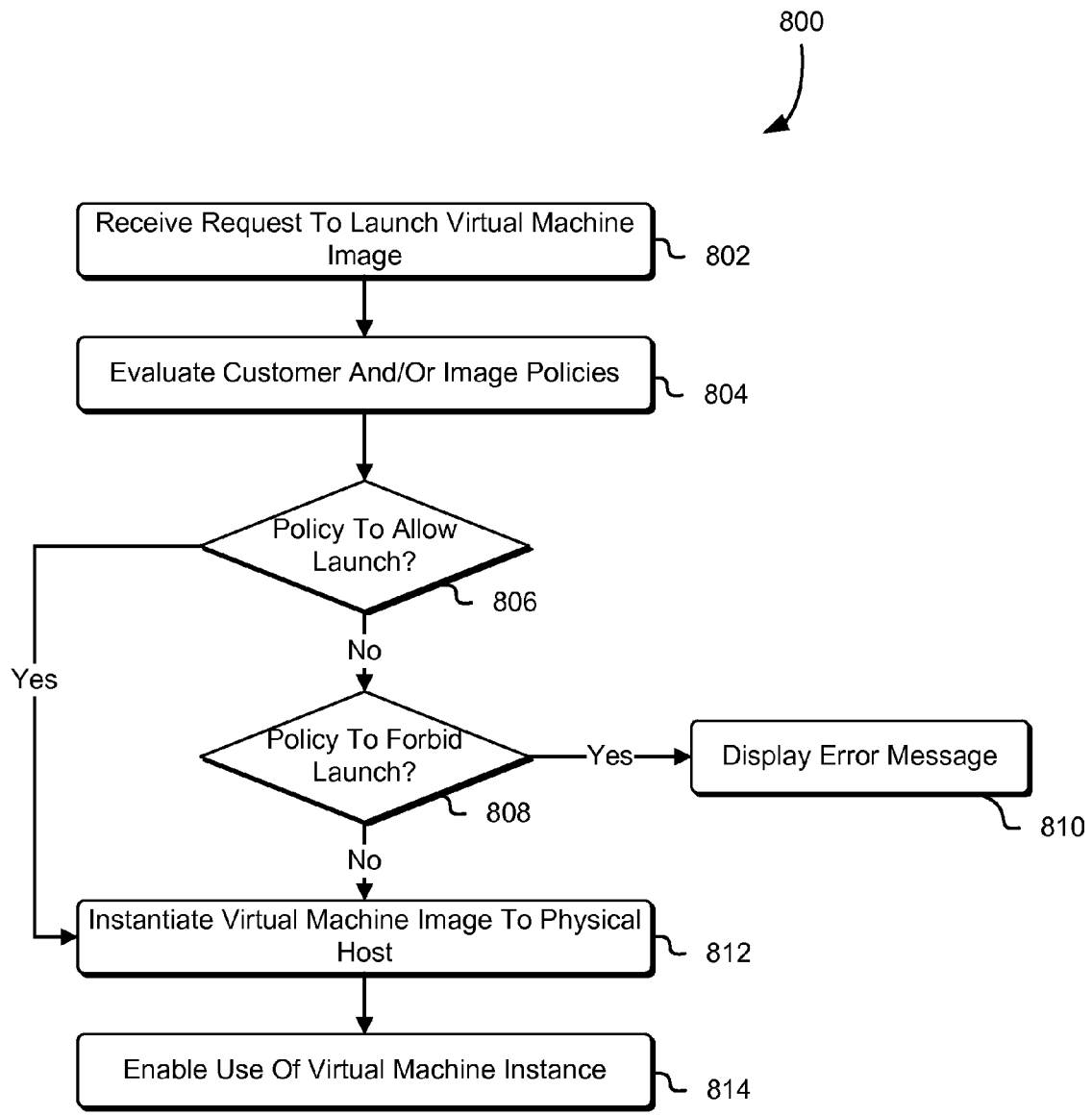
FIG. 8 shows an illustrative example of a process for launching a virtual machine image based at least in part on one or more applicable policies in accordance with at least one embodiment.

As noted above, customers of a virtual computer system service and vendors of virtual machine images may define one or more policies that may be used, by the virtual computer system service, to determine whether a customer or other user may utilize a virtual machine image to generate a new virtual machine instance. Accordingly, FIG. 8 shows an illustrative example of a process 800 for launching a virtual machine image based at least in part on one or more applicable policies in accordance with at least one embodiment. The process 800 may be performed by a virtual computer system service configured to enable customers and vendors to define one or more policies for defining a level of access to one or more virtual machine images. Further, the virtual computer system service may be configured to evaluate these policies to determine whether a customer may utilize a virtual machine image to create a new virtual machine instance.

As noted above, the virtual computer system service may be configured to provide customers of the virtual computer system service with an interface, which the customers may utilize to submit one or more requests to launch a virtual machine image. For instance, as illustrated in FIG. 4, the interface may include a listing of one or more virtual machine images, which the customer may utilize to select an appropriate virtual machine image for creation of a new virtual machine instance. Accordingly, the virtual computer system service may receive 802 a request to launch a selected virtual machine image.

Once the virtual computer system service has received the request from a customer or other delegated user, the virtual computer system service may evaluate 804 the customer and/or virtual machine image policies to determine whether the customer or delegated user may utilize the selected virtual machine image to create a new virtual machine instance. As noted above, the virtual computer system service may enable customers to define one or more policies to define a level of access to one or more virtual machine images made available by a plurality of vendors. For instance, a customer may generate a policy that specifies that the customer or other delegated user of the customer account cannot utilize a virtual machine image created by a particular vendor. Alternatively, the customer may generate a policy that defines a list of vendors that are to be trusted and whose virtual machine images may be used to create a virtual machine instance.

In addition to customer policies, vendors of virtual machine images may attach one or more policies to each of the virtual machine images uploaded to the virtual machine image data store. For instance, a vendor may create one or more policies defining one or more customers that may not be permitted to utilize the uploaded virtual machine image. Alternatively, or additionally, the vendor may create one or more policies defining a set of conditions wherein the virtual machine image may not be used. For instance, if the customer uses a particular virtual computer system configuration, the virtual machine image may not operate properly when instantiated to this virtual computer system. Thus, the policy may be defined to prevent such occurrences.

Once the virtual computer system service has evaluated the customer and/or virtual machine image policies, the virtual computer system service may determine 806 whether there are one or more policies that may allow the customer or delegated user to launch the virtual machine image. For instance, the one or more policies may include an affirmative statement that the particular customer or delegated users may utilize the virtual machine image to create a virtual machine instance. If there are no policies that explicitly allow a customer or delegated user to launch the virtual machine image to create a virtual machine instance, the virtual computer system service may determine 808 whether there are one or more policies that may forbid the customer or delegated user to launch the virtual machine image. For instance, as noted above, a customer may define one or more policies prohibiting the customer or any other delegated user to use the customer account to utilize virtual machine images created by one or more specific vendors. In another instance, a vendor may generate one or more policies that are included with his/her virtual machine images that may prohibit a customer from utilizing these virtual machine images if the customer's virtual computer system configuration is not compatible with the virtual machine images.

If the customer and/or virtual machine image policies specifically forbid a customer or delegated user from utilizing the selected virtual machine image, the virtual computer system service may cause the interface to display 810 an error message. The error message may comprise information detailing the one or more reasons why the customer or delegated user may not use the selected virtual machine image. Alternatively, the error message may only include information detailing that the request has been denied, without any additional reasons for the denial of the request.

If there is a customer policy and/or a virtual machine image policy that explicitly allows the customer to utilize the selected virtual machine image or no policies have been defined that forbid a customer or delegated user from utilizing the selected virtual machine image, the virtual computer system service may instantiate 812 the selected virtual machine image to a physical host and enable 814 the customer or delegated user to utilize the newly created virtual machine instance. For instance, the virtual computer system service may allocate the resources necessary (e.g., the processors and RAM required to operate the components of the machine image) to process the virtual machine image. Subsequently, the virtual machine image may be instantiated on one or more physical storage devices (e.g., one or more servers or hard drives) that may act as a physical host for the virtual machine instance.

Figure 9:
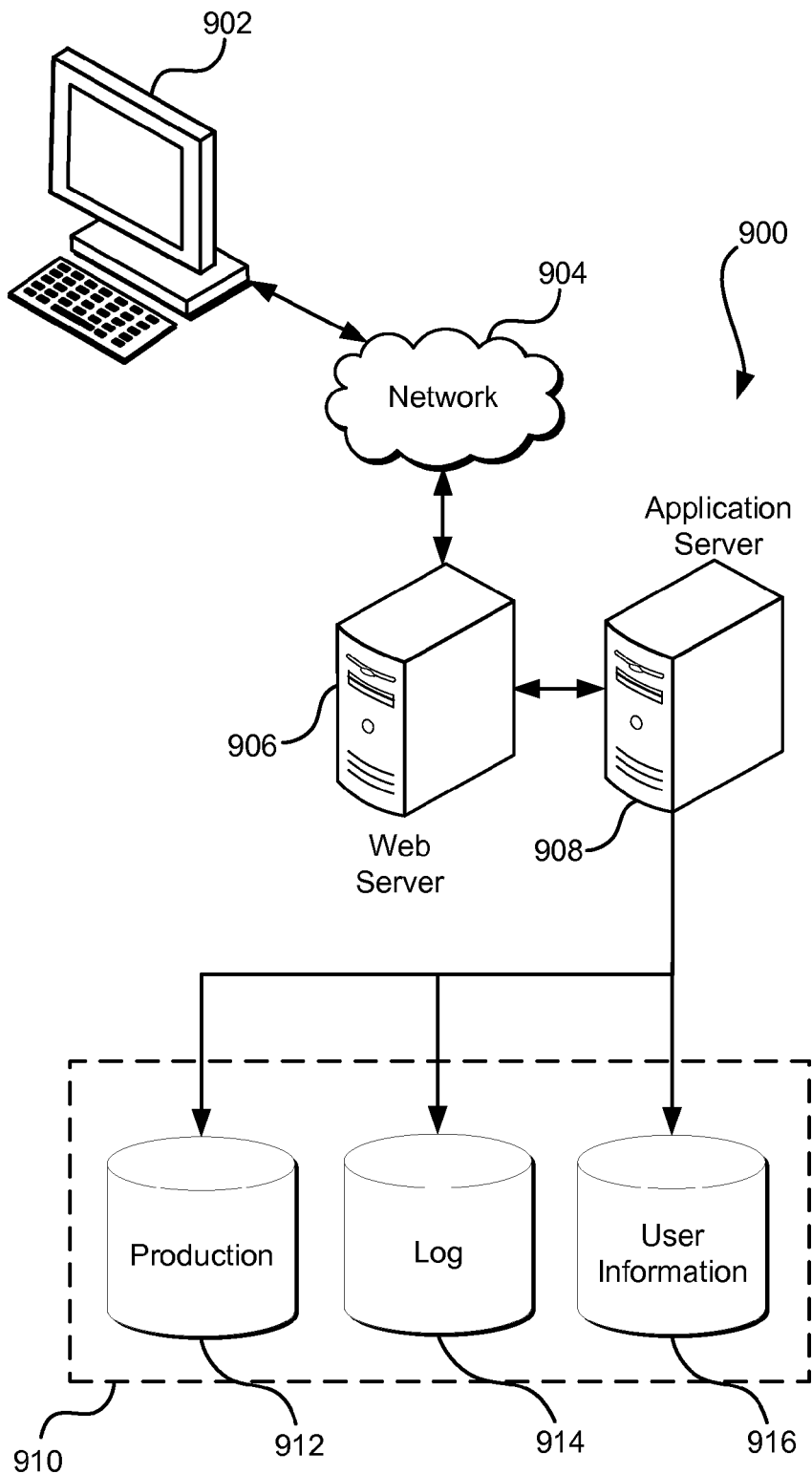
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for authenticating a virtual machine image, comprising:
   under the control of one or more computer systems configured with executable instructions,
   receiving, from a vendor, a virtual machine image, a digital signature of the virtual machine image, a digital certificate comprising a public cryptographic key usable to verify the digital signature, and one or more policies defining a level of access to the virtual machine image for one or more customers of a computing resource service provider;
   using the digital certificate and the public cryptographic key to verify the digital signature of the virtual machine image; and
   as a result of verifying the digital signature of the virtual machine image, making the virtual machine image available for selection in a computing resource service provider marketplace with an indication that the virtual machine image has been verified as authentic;
   as a result of the customer of the computing resource service provider having selected the virtual machine image, evaluating, by a processor, the one or more policies to determine if the customer is authorized to use the selected virtual machine image; and
   as a result of determining that the customer is authorized to use the selected virtual machine image, using the selected virtual machine image to instantiate a virtual machine.

2. The computer-implemented method of claim 1, wherein the indication is inclusion of the virtual machine image within a listing of virtual machine images.

3. The computer-implemented method of claim 1, further comprising providing, through a certificate authority, the digital certificate comprising the public cryptographic key to the vendor of virtual machine images upon verifying that the vendor of virtual machine images is a trusted vendor authorized to upload authentic virtual machine images.

4. The computer-implemented method of claim 1, wherein the digital certificate comprising the public cryptographic key was previously provided by the vendor and was stored within a data store comprising one or more physical storage devices for storage of a plurality of digital certificates such that the stored digital certificate can also be used to verify the digital signature.

5. The computer-implemented method of claim 1, wherein the computing resource service provider marketplace includes a plurality of virtual machine images available for selection, the plurality of virtual machine images comprising virtual machine images that have been verified as authentic and virtual machine images that have not been verified as authentic.

6. The computer-implemented method of claim 1, further comprising providing the customer with one or more modules of executable code usable to independently verify the digital signature of the virtual machine image upon selection of the virtual machine image from the marketplace.

7. A system, comprising:
one or more processors; and
memory having stored therein instructions that, when executed by the one or more processors, cause the system to:
receive, from a vendor, a virtual machine image, a digital signature of the virtual machine image, a digital certificate comprising a public cryptographic key usable to verify the digital signature, and one or more policies defining a level of access to the virtual machine image for one or more customers of a computing resource service provider;
use the digital certificate and the public cryptographic key to verify the digital signature of the virtual machine image; and
as a result of verifying the digital signature of the virtual machine image, make the virtual machine image available for selection in a computing resource service provider marketplace with an indication that the virtual machine image has been verified as authentic;
as a result of the customer of the computing resource service provider having selection of the virtual machine image, evaluate by a processor, the one or more policies to determine whether use the selected virtual machine image is authorized; and
as a result of determining that the customer is authorized to use the selected virtual machine image, use the selected virtual machine image to instantiate a virtual machine.

8. The system of claim 7, wherein the indication is inclusion of the virtual machine image within a listing of virtual machine images.

9. The system of claim 7, wherein:
the virtual machine image is received from a vendor of virtual machine images; and
the instructions further comprise instructions that, when executed by the one or more processors, cause the system to issue, through a certificate authority, the digital certificate comprising the public cryptographic key to the vendor of virtual machine images contingent on verification that the vendor of virtual machine images is a trusted vendor authorized to upload authentic virtual machine images.

10. The system of claim 7, wherein:
the digital certificate comprising the public cryptographic key was previously provided by a vendor of virtual machine images; and
the system further comprises a data store comprising one or more physical storage devices that stores a plurality of digital certificates, including the digital certificate, the plurality of digital certificates comprising the digital certificate and another digital certificate associated with another vendor of virtual machine images.

11. The system of claim 7, wherein the user interface is a computing resource service provider marketplace that includes a plurality of virtual machine images available for selection, the plurality of virtual machine images comprising virtual machine images that have been verified as authentic and virtual machine images that have not been verified as authentic.

12. The system of claim 7, wherein the instructions further comprise instructions that, when executed by the one or more processors, cause the system to provide one or more modules of executable code usable to independently verify the digital signature of the virtual machine image upon selection of the virtual machine image from the user interface.

13. The system of claim 7, wherein:
the policy specifies an identity associated with the digital certificate; and
at least one way of satisfying the policy to be authorized to use the selected virtual machine image includes the identity being specified by the digital certificate.

14. A set of non-transitory computer-readable storage medium having stored thereon instructions that, when executed by one or more processors of a computer system, cause the computer system to:
receive, from a vendor, a virtual machine image, a digital signature of the virtual machine image, a digital certificate comprising a public cryptographic key usable to verify the digital signature, and one or more policies defining a level of access to the virtual machine image for one or more customers of a computing resource service provider;
use the digital certificate and the public cryptographic key to verify the digital signature of the virtual machine image; and
as a result of verifying the digital signature of the virtual machine image, make the virtual machine image available for selection in a computing resource service provider marketplace with an indication that the virtual machine image has been verified as authentic;
as a result of the customer of the computing resource service provider having selection of the virtual machine image, evaluate by a processor, the one or more policies to determine whether use the selected virtual machine image is authorized; and
as a result of determining that the customer is authorized to use the selected virtual machine image, use the selected virtual machine image to instantiate a virtual machine.

15. The set of non-transitory computer-readable storage media of claim 14, wherein the user interface is part of an electronic marketplace that makes multiple virtual machine images available for selection by a customer of a computing resource service provider that operates the computer system.

16. The set of non-transitory computer-readable storage media of claim 14, wherein:
the virtual machine image is received from a vendor of virtual machine images; and
the instructions further comprise instructions that, when executed by the one or more processors, cause the system to issue the digital certificate comprising the public cryptographic key to the vendor of virtual machine images contingent on verification that the vendor of virtual machine images is authorized to upload virtual machine images.

17. The set of non-transitory computer-readable storage media of claim 4, wherein the instructions further comprise instructions that, when executed by the one or more processors, cause the computer system to:
   as a result of selection of another virtual machine image via the user interface.

18. The set of non-transitory computer-readable storage media of claim 14, wherein the user interface includes a plurality of virtual machine images available for selection, the plurality of virtual machine images comprising at least one virtual machine images that has been verified as authentic and at least one virtual machine image that has not been verified as authentic.

19. The set of non-transitory computer-readable storage media of claim 14, wherein the user interface is configured to receive input that, when received, causes the user interface to exclude virtual machine images that are unverified as trusted from selection.

20. The set of non-transitory computer-readable storage media of claim 14, wherein the instructions that cause the computer system to evaluate the one or more policies are based at least in part on a network to which the virtual machine is to be connected.

* * * * *